US012643418B2

(12) United States Patent

Maloschik

(10) Patent No.: US 12,643,418 B2

(45) Date of Patent: Jun. 2, 2026

(54) SMART TOWING SYSTEM

(71) Applicant: Peter Maloschik, Brentwood, CA (US)

(72) Inventor: Peter Maloschik, Brentwood, CA (US)

( * ) Notice: Subject to any disclaimer, the term of this patent is extended or adjusted under 35 U.S.C. 154(b) by 289 days.

(21) Appl. No.: 18/493,780

(22) Filed: Oct. 24, 2023

(65) Prior Publication Data

US 2025/0128610 A1 Apr. 24, 2025

(51) Int. Cl.

| *B60L 15/20* | (2006.01) |
| *B60D 1/145* | (2006.01) |
| *B60D 1/62* | (2006.01) |
| *B60L 7/18* | (2006.01) |

(52) U.S. Cl.

CPC ............. *B60L 15/2045* (2013.01); *B60L 7/18* (2013.01); *B60D 1/145* (2013.01); *B60D 1/62* (2013.01); *B60L 2200/28* (2013.01)

(58) Field of Classification Search

CPC .... B60L 15/2045; B60L 7/18; B60L 2200/28; B60L 2250/16; B60D 1/145; B60D 1/62

See application file for complete search history.

(56) References Cited

U.S. PATENT DOCUMENTS

| 6,016,694 | A | * | 1/2000 | Decker | ................. | B60T 17/221 |
| | | | | | | 73/121 |
| 8,700,284 | B2 | * | 4/2014 | Wojtkowicz | .............. | B60L 7/18 |
| | | | | | | 903/907 |
| 10,611,247 | B1 | * | 4/2020 | Breen | ...................... | B60D 1/62 |

| 11,724,687 | B2 | * | 8/2023 | Salter | ............. | B60W 30/18172 |
| | | | | | | 701/22 |
| 11,867,520 | B2 | * | 1/2024 | Madineni | ................ | B60L 58/12 |
| 12,049,210 | B2 | * | 7/2024 | Salter | .................. | B60L 15/2009 |
| 12,252,039 | B2 | * | 3/2025 | Treharne | ................ | B60L 50/60 |
| 12,296,809 | B2 | * | 5/2025 | Treharne | ................ | B60T 8/323 |
| 2019/0009760 | A1 | * | 1/2019 | Zenner | .................... | B60T 8/323 |
| 2020/0164890 | A1 | * | 5/2020 | Shin | ........................ | B60K 6/48 |
| 2021/0197673 | A1 | * | 7/2021 | Espig | ...................... | B60L 53/53 |
| 2021/0347216 | A1 | * | 11/2021 | Robertson | ............. | B60D 1/145 |
| 2022/0238952 | A1 | * | 7/2022 | Polic | ................... | H01M 50/204 |
| 2022/0242497 | A1 | * | 8/2022 | West | ...................... | B60D 1/145 |
| 2022/0324433 | A1 | * | 10/2022 | Salter | ............. | B60W 30/18172 |
| 2023/0068557 | A1 | * | 3/2023 | Burkhart | ................ | B62D 59/04 |
| 2023/0096878 | A1 | * | 3/2023 | Thomason | ................ | B60P 3/12 |
| | | | | | | 320/109 |
| 2023/0311682 | A1 | * | 10/2023 | Moore | .................... | B60L 53/50 |
| | | | | | | 180/65.31 |
| 2023/0356707 | A1 | * | 11/2023 | Weston | ............. | B60W 30/1882 |
| 2024/0025383 | A1 | * | 1/2024 | Treharne | ................ | B60T 8/323 |
| 2024/0151547 | A1 | * | 5/2024 | Stout, II | .................... | B60R 1/26 |
| 2024/0270082 | A1 | * | 8/2024 | Ghannam | ............... | B60L 58/12 |
| 2024/0286499 | A1 | * | 8/2024 | Ricke | ................. | H01M 8/0494 |
| 2025/0033486 | A1 | * | 1/2025 | Abraham | ................. | B60L 7/10 |
| 2025/0108696 | A1 | * | 4/2025 | Ozawa | .................... | B60L 15/20 |

* cited by examiner

*Primary Examiner* — Mussa A Shaawat

(74) *Attorney, Agent, or Firm* — Bhasin Law, a PC

(57) ABSTRACT

The present disclosure provides a towing system for controlling the operation of a towed vehicle through the towing vehicle, where the towing vehicle comprises an assembly of a control lever, an e-pedal, and a dashboard screen, wherein the control lever is pulled backwards to generate and collect energy from the towed vehicle into a battery and control lever is pushed forward to use such energy to selectively propels the towing vehicle forward to gain momentum thus easing the load on the engine of the towing vehicle.

20 Claims, 10 Drawing Sheets

101

607

801

SMART TOWING SYSTEM

FIELD OF INVENTION

The present disclosure relates generally to the field of a towing system, specifically a smart towing system of coupling an electric vehicle with a towing vehicle for improved fuel efficiency and ride quality of the towing vehicle.

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

Vehicles, either commercial or non-commercial, capable of flat towing other vehicles by keeping all four wheels of the other vehicle on the ground behind and placing the other vehicle in neutral gear, such that the steering system of the other vehicle is free to turn with the vehicle capable of towing. However, towing an extra vehicle means more use of gas and poor mileage per gallon due to the extra load on the gas engine of the towing vehicle. As such, there is a need for a system and a method for towing a vehicle that instead of adding load on the towing vehicle providing a push and energy to the towing vehicle for better mileage and better ride quality.

SUMMARY

The following is a summary of the invention to provide a basic understanding of some aspects of the invention. This summary is not intended to identify key/critical elements of the invention or delineate the invention's scope. Its sole purpose is to present some concepts of the invention in a simplified form as a prelude to the more detailed description that is presented later.

The primary objective of the invention is to provide optimized controls of the towed vehicle through the towing vehicle, store energy generated by the towed vehicle while moving, and use the stored energy to selectively propel the towing vehicle and provide the necessary thrust to the towing vehicle while driving or towing.

In various embodiments, provided herein is a towing system within a towing vehicle comprising a control lever, a dashboard screen, and an e-pedal, wherein an operator of the towing vehicle manages energy production by the towed vehicle through the control lever and uses such energy to provide an instant thrust of energy to the towing vehicle. In various other embodiments, the control lever, the e-pedal and the dashboard screen are located in the towing vehicle.

In various embodiments, the control lever is pulled backwards to collect energy from the towed vehicle when the towed vehicle is in motion such energy is then stored into a battery located within the towed vehicle and used to selectively propel the towing vehicle. Thus, the stored energy provides an energy push to the towing vehicle for the towing vehicle to gain momentum and move, e.g., move uphill. Thus, the towing vehicle moves forward without putting a load on the engine of the towing vehicle while towing the towed vehicle.

In various embodiments, the control lever is a stick control lever or a switch control lever, wherein the control lever directly controls the movement, such as acceleration or deceleration of the towed vehicle through e-pedal and energy generation by the towed vehicle, wherein pushing the control lever in a forward direction accelerates the towing vehicle by transferring the electrical energy generated through the running of the towed vehicle from the battery of the towed vehicle to the towing vehicle.

In many embodiments, the towing vehicle further comprises an e-pedal, wherein the e-pedal functions as a pedal of the towed vehicle and allows the operator of the towing vehicle to control the acceleration and deceleration of the towed vehicle. The e-pedal is connected to a pedal of the towed vehicle, such that the pedal of the towed vehicle is disabled. Thus, a user of the towing vehicle controls the acceleration and deceleration of the towed vehicle by controlling the e-pedal through the control lever.

In various embodiments, the dashboard screen displays at least one operational feature of the towed vehicle, such as temperature, energy usage, energy generation, levels of the stored energy of the towed vehicle in real-time.

In many embodiments, the towed vehicle propels the towing vehicle using the energy stored in the battery of the towed vehicle by pushing the control lever forward, which provides the necessary push to the towing vehicle, thus moving it forward without putting any load on the engine of the towing vehicle or using extra gas of the towing vehicle.

In various embodiments, the towing vehicle and the towed vehicle are connected via a tow bar, wherein the tow bar connects the rear end of the towing vehicle directly to the front end of the towed vehicle. A tow bar will provide a secure connection between the towing vehicle and the towed vehicle, wherein the tow bar comprises at least two arms attaching to the towed vehicle and a pivot side to side for smooth towing and turning of the towed vehicle. The tow bars range in style, weight capacity and ease of use. In various embodiments, the towed vehicle is flat towed such that the four wheels of the towed vehicle are riding on the road and wherein the towed vehicle moves along with and in the same direction as the towing vehicle.

In various embodiments, provided herein is a towing system located within a towing vehicle to propel the towing vehicle forward or backwards using the energy from the towed vehicle, comprising a control lever, wherein the control lever is a stick control lever directly controlling the generation of energy within the towed vehicle and transferring such generated energy from the battery of the towed vehicle to the towing vehicle; a dashboard screen, wherein the dashboard screen is coupled to a towed vehicle controller, such that information displayed on the screen of the towed vehicle controller is displayed in real-time on the dashboard screen; and an e-pedal, wherein the e-pedal allows an operator of the towing vehicle to move the towed vehicle in a forward or a backward direction.

In many embodiments, the towed vehicle is an electric vehicle or a hybrid vehicle. In many other embodiments, the towing vehicle is a recreational vehicle, a motor home, a van, a commercial or a non-commercial vehicle capable of towing another vehicle.

In many other embodiments, provided herein is a method of operating a towing vehicle through controlling operations of the towed vehicle, comprising at least one of the steps of operating an electric motor of the towed vehicle to selectively propel the towing vehicle, operating the e-pedal located within the towing vehicle to provide acceleration to the towed vehicle; and operating a braking system of the towing vehicle to provide breaking resistance to the towing vehicle and the towed vehicle.

These and other features, aspects, and advantages of the present systems and methods will become better understood with references to the following figures and descriptions. This summary is an introduction to the concepts. Additional aspects and advantages of this invention will be apparent from the following detailed description of preferred embodiments, which proceeds with reference to the accompanying drawings.

BRIEF DESCRIPTION OF THE DRAWINGS

The accompanying drawings, where like reference numerals refer to identical or functionally similar elements throughout the separate views, together with the detailed description below, are incorporated in and form part of the specification and serve to illustrate further embodiments of concepts that include the claimed disclosure, and explain various advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
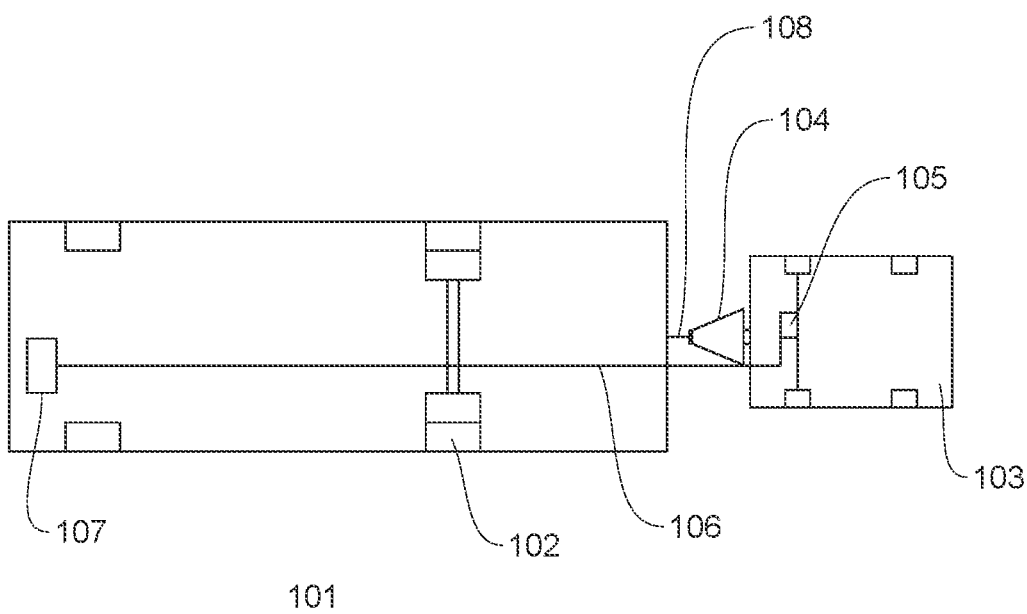
FIG. 1 illustrates a block view showing components of a towing system and towing resources according to an aspect of the present disclosure.

While the presently disclosed systems and methods are susceptible of embodiment in many different forms, there is shown in the drawings and will herein be described in detail several specific embodiments with the understanding that the present disclosure is to be considered as an exemplification of the principles of the presently disclosed systems and methods and is not intended to limit the disclosure systems and methods to the embodiments illustrated.

FIG. 1 illustrates a block view 101 showing components of a towing system and towing resources according to an aspect of the present disclosure. As shown, the towing system 101 comprises a towing vehicle 102, a towed vehicle 103, a tow bar 104, and a towing vehicle hitch 108. The tow bar 104 is connected to the towing vehicle hitch 108, which in turn connects to the towing vehicle 102. The tow bar 104 provides stability and flexibility to the towed vehicle through multiple arms or bars. While towing, the towed vehicle 103 is positioned behind the towing vehicle 102, such that the towed vehicle 103 moves along with the towing vehicle 102.

FIG. 1 further shows that the towed vehicle 103 comprises a towed vehicle controller 105 located within the towed vehicle, wherein the towed vehicle controller 105 displays one or more features of the towed vehicle and displays such information on towed vehicle controller's screen. The towed vehicle controller 105 screen shows a plurality of features and functions of the towed vehicle, including energy generation, energy usage, temperature within the towed vehicle, speed of the towed vehicle, etc. These features and functions shown on the screen of the towed vehicle controller 105 are mirrored or displayed in real-time on the dashboard screen 203 positioned within the towing vehicle allowing the operator of the towing vehicle to monitor the condition of the towed vehicle as it moves. Displaying one or more operating features of the towed vehicle 103 in real-time on a dashboard screen 203 located within the towing vehicle 102 helps manage the operating conditions of the towed vehicle. FIG. 1 further shows that the towed vehicle controller 105 is connected to the towing system 107 located within the towing vehicle 102 through a cable 106. The cable 106 connects the towed vehicle controller 105 with the towing system 107. The cable 106 further connects a pedal within the towed vehicle to the e-pedal 201 within the towing vehicle, wherein the pedal in the towed vehicle is disabled before such connection between the pedal of the towed vehicle and the e-pedal within the towing vehicle, such that acceleration or deceleration of the towed vehicle is controlled through the control lever 202 and the e-pedal 201.

Figure 2A:
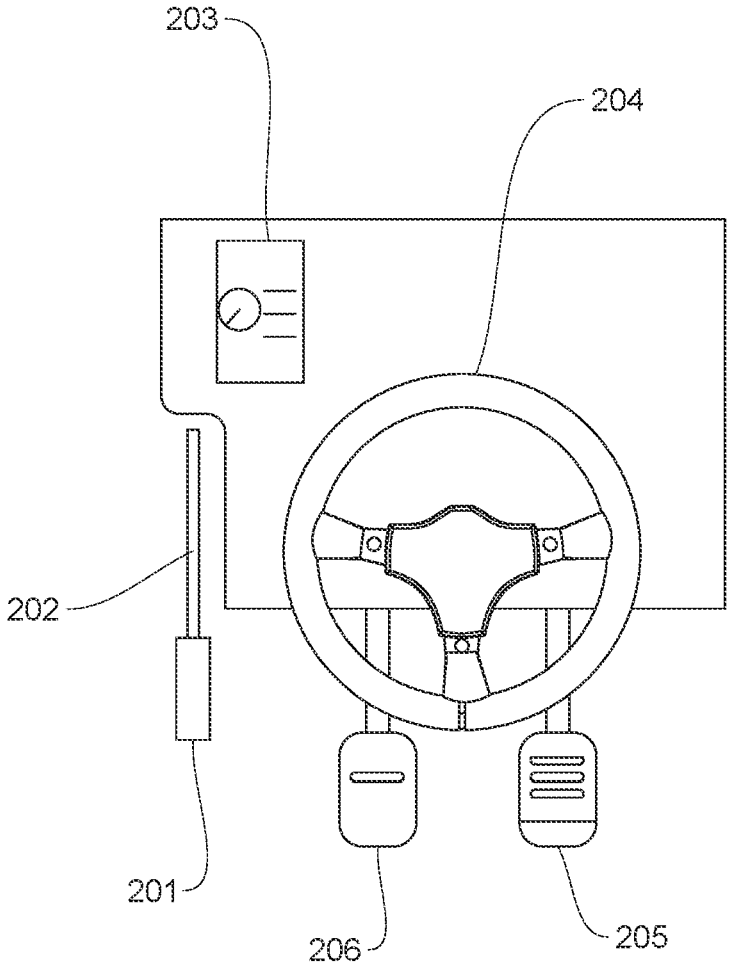
FIG. 2(a) illustrates embodiments of a towing system according to an aspect of the present disclosure.

FIG. 2(a) illustrates embodiments of the towing system according to an aspect of the present disclosure. The towing system 107 comprises an e-pedal 201 operated through a control lever 202 and a dashboard screen 203. The e-pedal 201 functions as the pedal for the towed vehicle 103 controlling the acceleration or deceleration of the towed vehicle, wherein the e-pedal is connected to a pedal of the towed vehicle through at least a cable. As further shown in FIG. 2(a), the e-pedal 201 is located in close vicinity to a towing vehicle operating system comprising an accelerator (205), a brake (206), and a steering wheel (204), but it is positioned separately at a distance for the user of the towing vehicle 102 to operate the towing system and the towing vehicle simultaneously. FIG. 2(a) further shows a dashboard screen 203, wherein the dashboard screen 203 is a wireless screen displaying information such as energy production or energy usage of the towed vehicle 103.

Figure 2B:
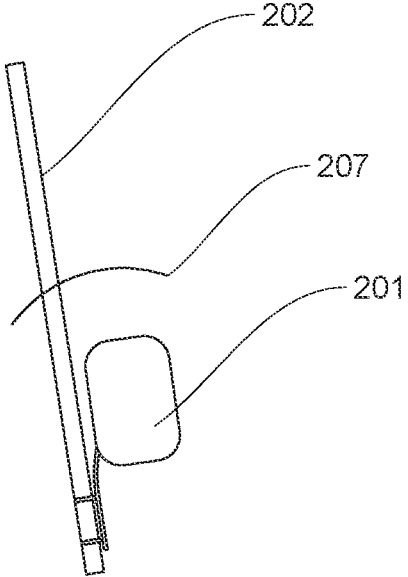
FIG. 2(b) illustrates a perspective view of an assembly of a control lever and an e-pedal according to the embodiments of the present disclosure.

FIG. 2(b) illustrates a perspective view of an assembly of a control lever (202) and an e-pedal (201) according to the embodiments of the present disclosure. As shown in FIG. 2(b), the control lever 202 is connected to the e-pedal 201 wherein the control lever 202 is held in a defined position through a base plate 207, as further demonstrated in FIG. 3. The e-pedal 201 is located at the bottom end of the control lever 202, allowing the operator of the towing vehicle 102 to control moving the e-pedal through the control lever in either a forward or backward direction by gripping it from the top end of the control lever 202.

By moving the control lever in a forward direction, a user applies pressure on the e-pedal 201, similar to how pressure is applied by the foot while operating a motor vehicle. This pressure then accelerates the towed vehicle as the e-pedal is directly connected to the pedal of the towed vehicle. Conversely, by moving the control lever backward, the user releases pressure on the e-pedal, which in turn deceleration the towed vehicle. Therefore, the user can control the speed of the towed vehicle as well as the generation of energy.

Figure 3:
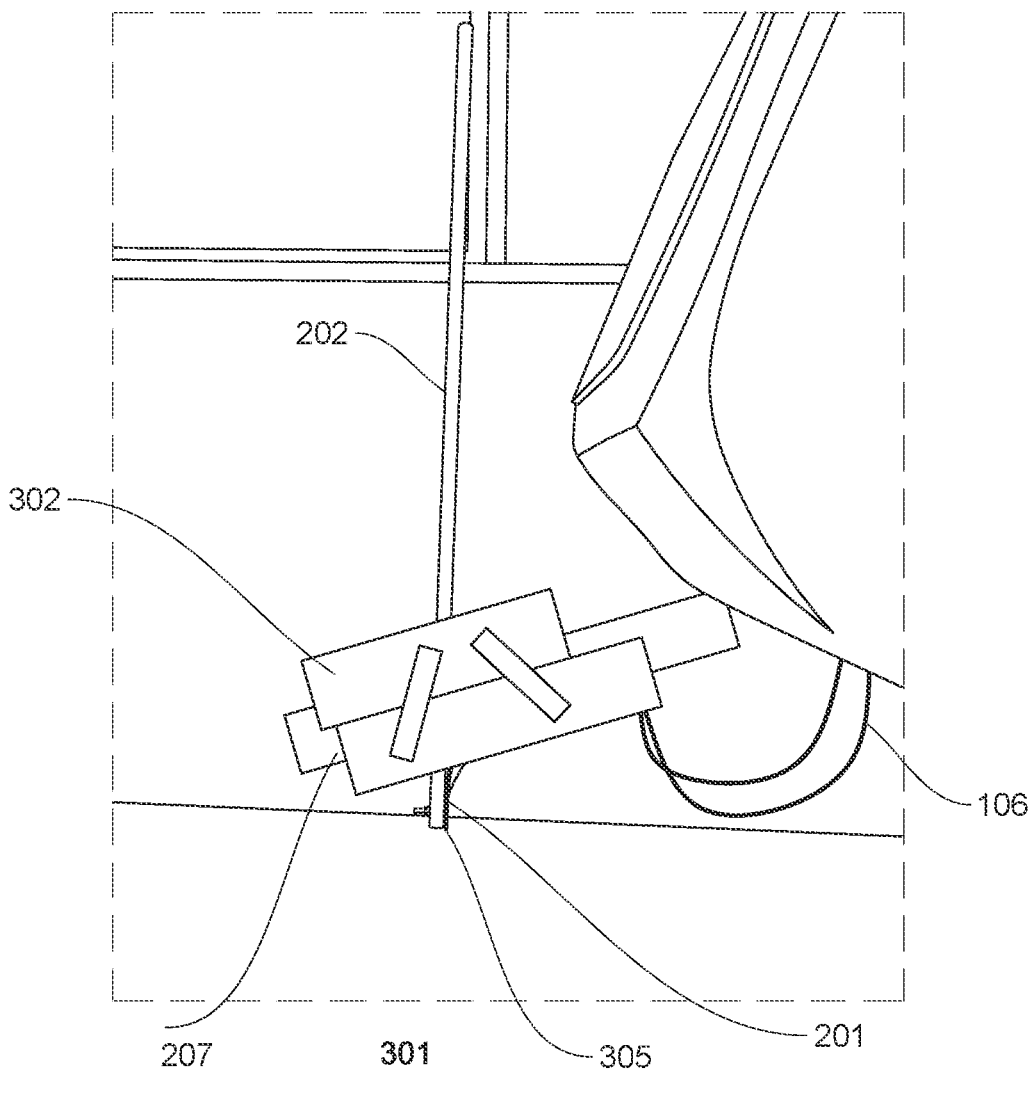
FIG. 3 illustrates a towing system located within the towing vehicle according to the embodiments of the present disclosure.

FIG. 3 further illustrates components of a towing system located within the towing vehicle 102 according to the embodiments of the present disclosure (301). As shown in FIG. 3, the towing system comprises a control lever 202 and an e-pedal 201, wherein the components of the towing system are functionally and spatially at a distance from the towing vehicle operating system. The control lever 202 comprises at least one base plate 207 and at least a front plate 302, which together form a geometrical shape consisting four equal sides or two equal sides running parallel. The base plate and the front plate are connected through a plurality of side plates. FIG. 3 further shows an e-pedal holder 305 holding the e-pedal 201 within or affixed to it. The e-pedal is positioned near the bottom end of the control lever 202.

Figure 4:
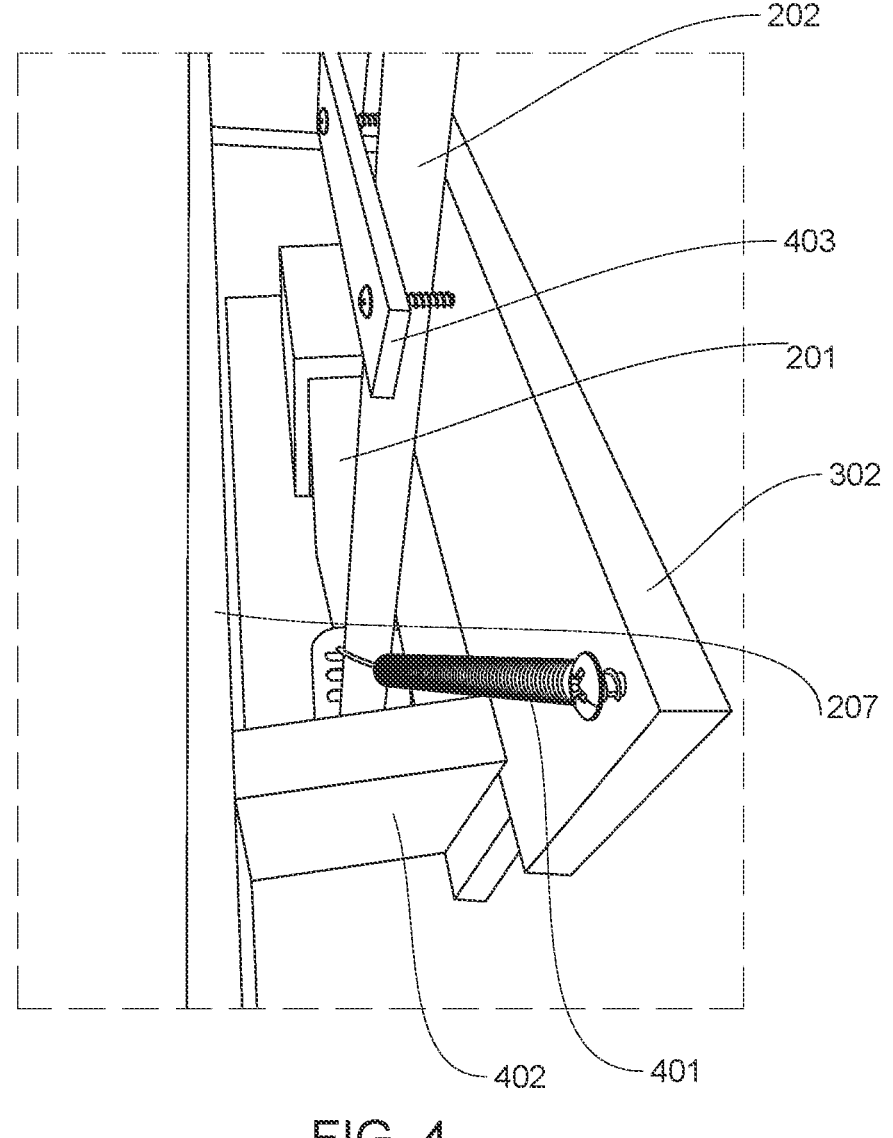
FIG. 4 illustrates a close-up of an assembly of a control lever and the e-pedal according to the embodiments of the present disclosure.

FIG. 4 illustrates a close-up view of an assembly comprising a control lever 202 and the e-pedal 201 according to the embodiments of the present disclosure. The assembly comprises a base plate 207, a front plate 302, a control lever 202, a gripping plate assembly 403, a spring 401 and a spacer panel 402 to form a space for the free movements of the control lever between the front plate and the base plate. The spring 401 propels the e-pedal forward when the control lever is pushed for acceleration. The spacer panel 402 is positioned between the front plate 302 and the base plate 207 creating a space for free back and forth movements of the control lever 202 during its use. The assembly further comprises a gripping plate assembly 403 located in between the front plate 302 and the base plate 207. The gripping plate assembly 403 has a back end and two side ends, wherein the back end, the two side ends and a portion of the front plate create a space or an opening to keep the control lever at a predetermined position. The gripping plate assembly 403 comprises a plurality of sides to support the front plate panel. A user of the assembly or the towing system may position the control lever 202, dashboard screen 203, and the e-pedal 201 in another location within the towing vehicle which is more convenient to use or more space friendly, but the assembly of the towing system is located within the towing vehicle 102. Additionally, the assembly of the control lever 202 and the e-pedal 201 may be boxed in a close box with an opening on either end for the control lever 202 and the e-pedal 201. The assembly may be formed via different material or panels. However, the goal is to connect the control lever 202 with the e-pedal 201 within the towing vehicle 102 and use this assembly together with the dashboard screen 203 to control the energy generation within the towed vehicle 103 and usage of this energy to provide a necessary thrust, push to the towing vehicle when necessary. This thrust of energy would provide necessary moment to the towing vehicle 102 without putting load on the engine of the towing vehicle 102 or using any energy from the towing vehicle 102.

Figure 5:
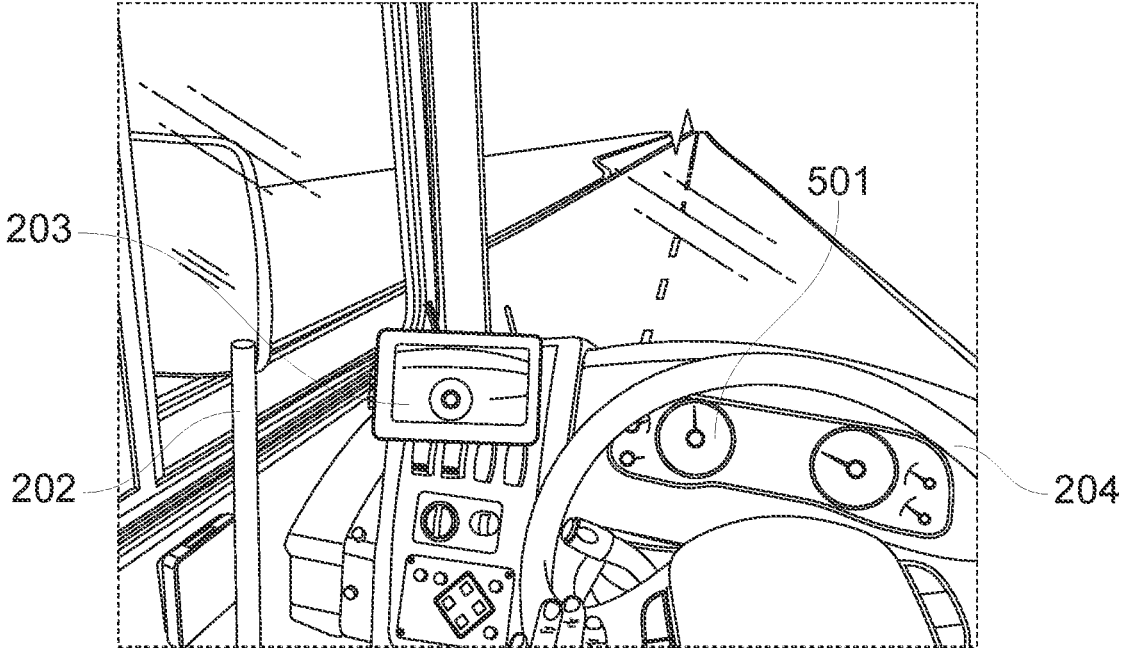
FIG. 5 illustrates the position of a control lever and dashboard screen according to the embodiments of the present disclosure.

FIG. 5 illustrates further the position of the control lever 202 and the dashboard screen 203 according to the embodiments of the present disclosure. As shown in FIG. 5, the control lever 202 and the dashboard screen 203 are positioned in close vicinity to a towing vehicle steering wheel 204 and a towing vehicle dashboard 501 such that an operator of the towing vehicle simultaneously monitors the towing vehicle dashboard 501 and the dashboard screen 203 while driving helping the operator of the towing vehicle to view energy production or energy usage within the towed vehicle while driving.

Figure 6A:
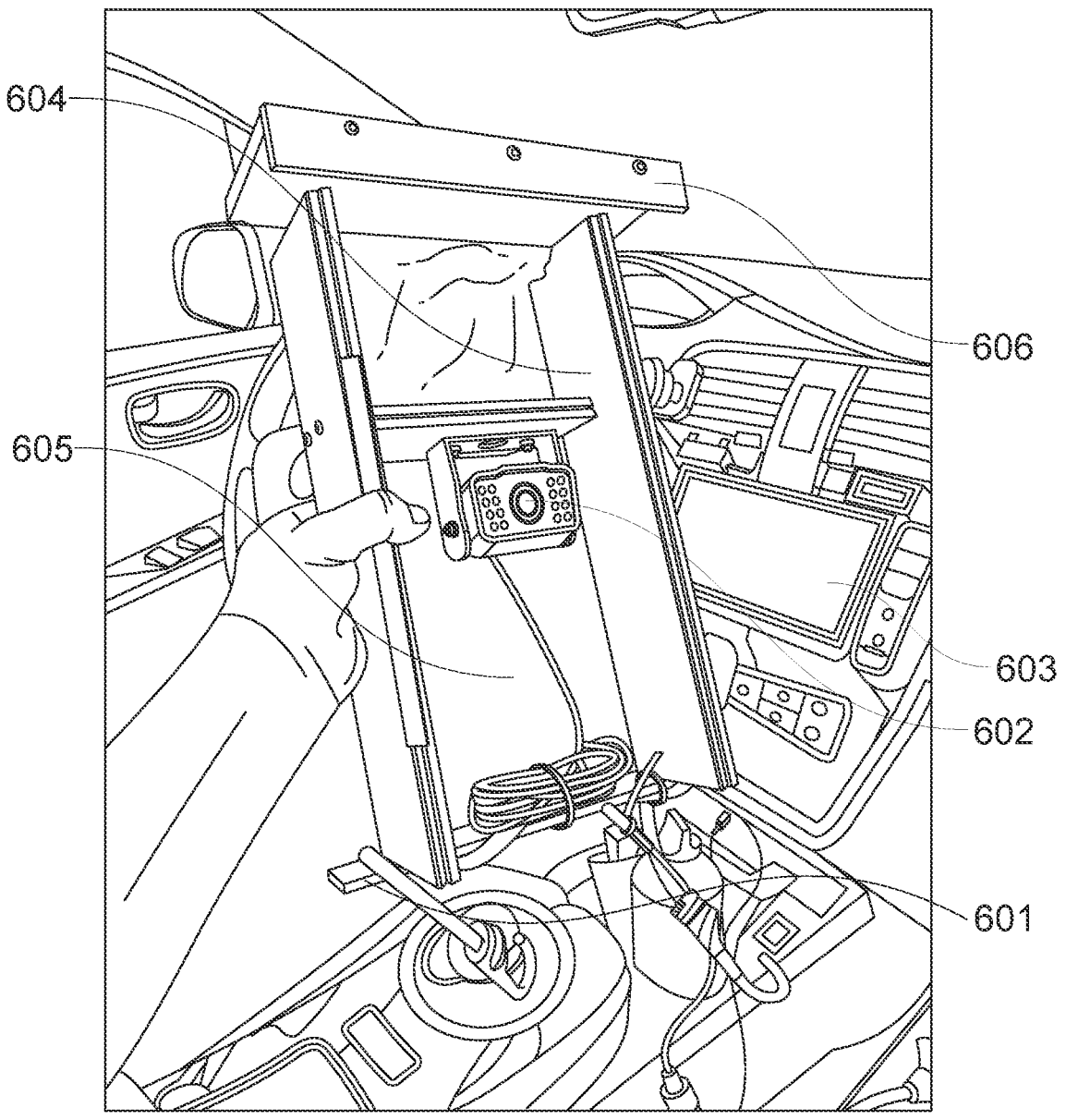
FIG. 6(a) illustrates a back side of a mounting frame according to the embodiments of the present disclosure.
Figure 6B:
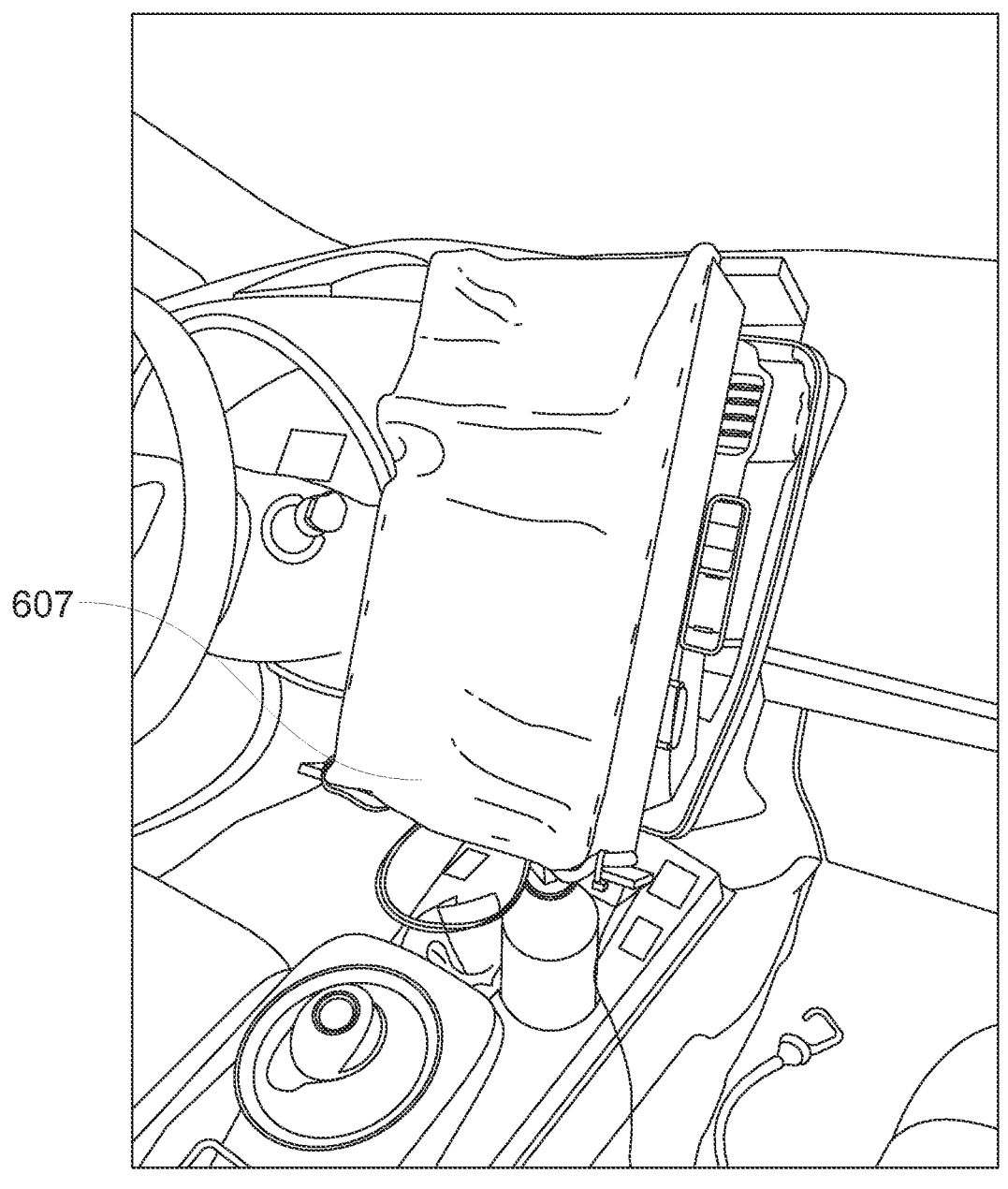
FIG. 6(b) illustrates a mounting frame covering a towed vehicle controller screen according to the embodiments of the present disclosure.

FIG. 6(a) illustrates a back side of a mounting frame according to the embodiments of the present disclosure. The mounting frame comprises a front panel 605 that covers the face of a towed vehicle controller screen 603, a pair of sides panels 604 running parallel to each other, such as a left-side panel and a right-side panel, wherein the size of both the left side panel and the right-side panel is same and they face each other to cover the towed vehicle controller screen from each side, and a top panel 605 and a bottom panel 601. FIG. 6(b) shows a back side of the front panel 605 facing the towed vehicle controller screen 603. The mounting frame may be of any geometrical shape, such as a rectangular shape with a size equal to or slightly larger than the size of the towed vehicle controller screen 603, such that the mounting frame can fully cover the towed vehicle controller screen 603. The mounting frame further comprises a top panel 606 covering the towed vehicle controller screen from the top. Thus, the mounting frame covers the towed vehicle controller screen to avoid exposure to light. FIG. 4(a) further displays the position and placement of the mounting frame within the towed vehicle 103. The back side of the front panel further shows a camera 602, wherein the camera is positioned in a way that the lens of the camera faces the towed vehicle controller screen 603 and transmit the information on the towed vehicle information screen to the dashboard screen 203 in real time.

FIG. 6(b) illustrates a mounting frame covering the towed vehicle controller screen according to the embodiments of the present disclosure. The front panel 607 of the mounting frame covers the entire towed vehicle information screen. The front panel of the mounting frame is a dark panel such that no light falls on the towed vehicle information screen. Thus, an operator of the towing vehicle receives continuous real-time information of the conditions, including energy conditions or usage within the towed vehicle.

Figure 7:
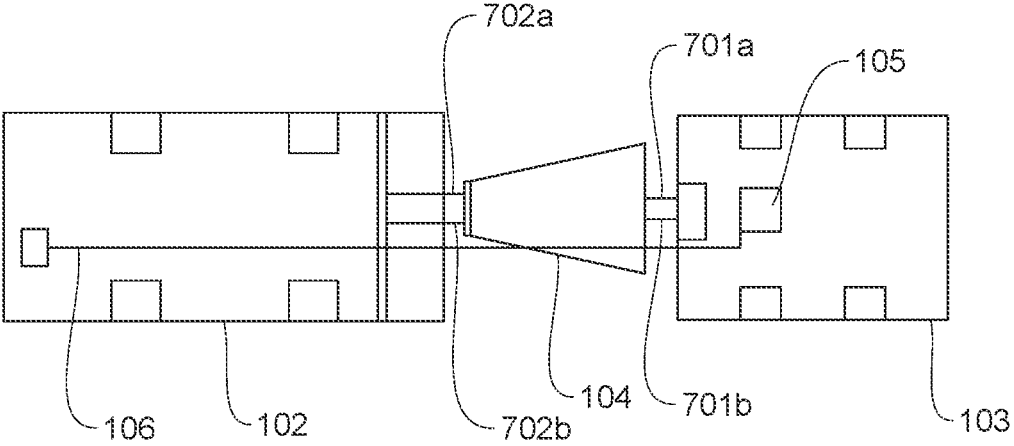
FIG. 7 illustrates an assembly of the towed vehicle and the towing vehicle according to the present disclosure.

FIG. 7 illustrates an assembly of the towed vehicle and the towing vehicle according to the present disclosure, wherein at least a part of the towed vehicle 103 is connected to at least a part of the towing vehicle 102 through at least a cables. As an example, a cable 701(a) connects a pedal in the towed vehicle to the e-pedal 201 in the towing vehicle 102 and another cable 701(b) connects a light, such as a back light of the towed vehicle to the operating system of the towing vehicle 102. The cables run from the towed vehicle 103 to the towing vehicle 102 through the tow bar 104. As shown in FIG. 7 a section of the cable, such as 701(a) or 701(b) runs from at least a part of the towed vehicle 103 to the tow bar, pass through the tow bar and connects to a corresponding part of the towing vehicle as shown in 702(a) or 702(b).

Figure 8:
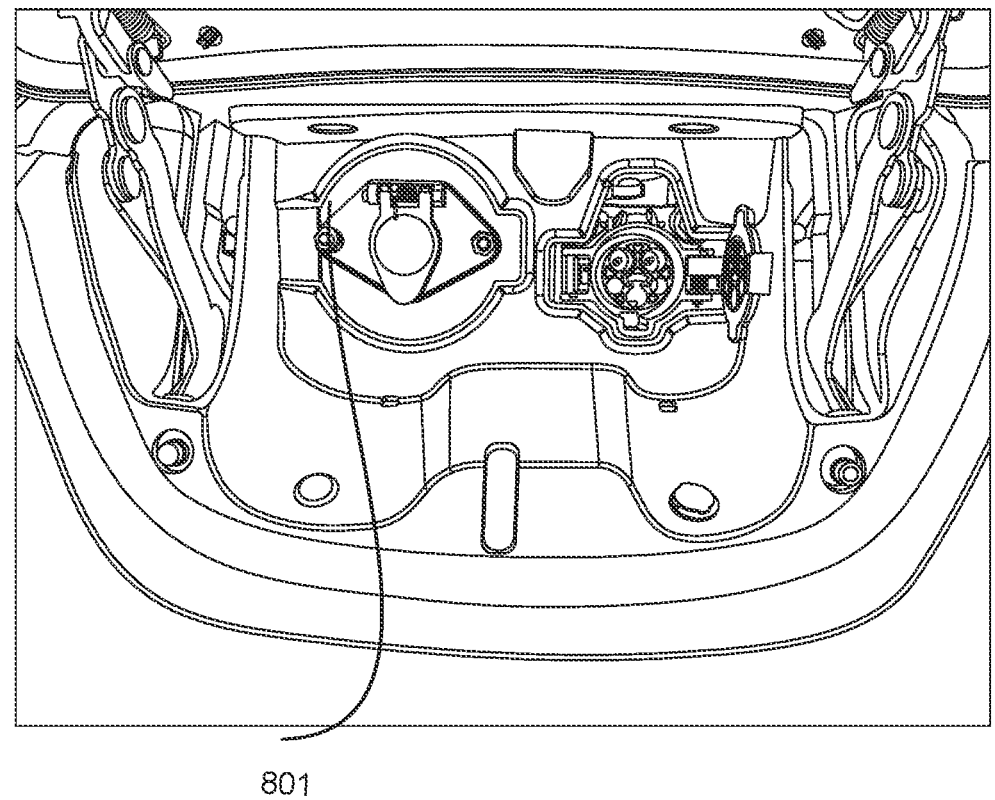
FIG. 8 illustrates a plurality of connectors connecting embodiments of the towed vehicle and the towing vehicle according to the present disclosure.

FIG. 8 illustrates a plurality of connectors in the towed vehicle according to the present disclosure. As shown in FIG. 8, there is at least a connector (such as 801) located within the front-end cavity of the towed vehicle 103. The connectors can plug in a variety of plugs or cable connectors. The connector plugs in or connects a part of the towed vehicle 103 to the towing vehicle 102 for operation and towing.

Further, there may be at least two connectors for different plugs or switches. A user of the disclosed system may install two or more connectors to connect a plurality of cables from the towed vehicle to the towing vehicle. The connectors are located at the front end of the towed vehicle 103 within a cavity like opening.

Therefore, the present disclosure provides a system designed to help generate, control, and maintain energy levels within the towed vehicle and use such energy to provide a torque or acceleration to the towing vehicle. A towing system is located within a towing vehicle wherein the towing system comprises a control lever, an e-pedal and a dashboard screen working in sync to ensure smooth acceleration of the towing vehicle and provide real-time information about energy generation and consumption in the towed vehicle. The towing system is connected to the towed vehicle through at least a cable wherein the cable connection enables a seamless communication between the e-pedal in the towing vehicle and a pedal in the towed vehicle, or between the towing vehicle's dashboard screen and a towed vehicle controller screen. The control lever within the towing system helps generate energy within the towed vehicle, wherein pulling and holding the control lever in a backward position within the gripping plate assembly and moving the towed vehicle through the towing vehicle help generate energy within the towed vehicle. The energy generated is then stored in a battery within the towed vehicle, such that pushing the control lever in a forward direction transfers the energy from the battery of the towed vehicle to the towing vehicle and provides the necessary thrust or push to the towing vehicle, such that the towing vehicle accelerates in a forward direction easing the load on the engine of the towing vehicle. The instant thrust or push helps with a smooth ride uphill or providing extra torque to the towing vehicle.

The disclosure further provides a method of using the towing system for operating a towed vehicle and using energy generated within the towed vehicle to provide a push or thrust to the towing vehicle for moving the towing vehicle forward. The method comprises connecting the towed vehicle with the towed vehicle using a tow bar; pulling a control lever in a backward direction to collect energy generated by the towed vehicle when the towed vehicle is in motion, wherein the energy is stored in a battery located within the towed vehicle; monitoring the levels of energy generated or energy collected in the battery of the towed vehicle through a dashboard screen located in the towing vehicle; and pushing the control lever forward to transfer the energy stored in the battery of the towed vehicle to the towing vehicle wherein transferring the energy provides a thrust to the towing vehicle moving the towing vehicle in a forward direction without exerting load on the engine of the towing vehicle.

A towing vehicle is a vehicle capable of towing another vehicle or an object with it. The towing vehicle may be a motorhome, a recreational vehicle, a truck, or other commercial or non-commercial vehicle with towing capabilities.

The towed vehicle is a vehicle being towed by the towing vehicle. The towed vehicle may be a car, an electric car, or other similar vehicles.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed and that that scope shall not be restricted, except in the light of the appended claims and their equivalents.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Accordingly, the disclosure of the present techniques and technologies is intended to be illustrative but not limiting.

What is claimed is:

1. A towing system within a towing vehicle comprising:
a control lever, the control lever being manually operated by an operator of the towing vehicle to directly control acceleration and deacceleration of a towed vehicle by commanding movement of an e-pedal in forward or backward direction;
a dashboard screen, the dashboard screen being connected to a towed vehicle dashboard camera positioned to face a controller screen of the towed vehicle, the dashboard screen configured to display in real-time, information mirrored from the controller screen of the towed vehicle; and
the e-pedal, the e-pedal being directly connected to a pedal of the towed vehicle to allow the operator of the towing vehicle to control acceleration and deacceleration of the towed vehicle,
wherein the operator of the towing vehicle manages energy production by the towed vehicle through coordinated use of the control lever and the e-pedal, and uses such energy to propel the towing vehicle.

2. The towing system of claim 1, wherein the control lever, the e-pedal and the dashboard screen are located in close vicinity to a towing vehicle operating system.

3. The towing system of claim 1, wherein the towed vehicle comprises at least one electric motor and at least one battery.

4. The towing system of claim 1, wherein the control lever is pulled backwards to
collect energy from the towed vehicle when the towed vehicle is in motion;
store such energy into a battery located within the towed vehicle; and
use such energy to propel the towing vehicle in a forward direction.

5. The towing system of claim 1, wherein the control lever is a stick control lever or a switch control lever.

6. The towing system of claim 1, wherein the control lever is not a stick control lever or a switch control lever.

7. The towing system of claim 1, wherein the control lever directly controls the acceleration or deceleration of the towed vehicle through the e-pedal.

8. The towing system of claim 1, wherein the dashboard screen is connected to a towed vehicle controller, such that information displayed on a towed vehicle controller screen is displayed in real-time on the dashboard screen.

9. The towing system of claim 1, wherein the e-pedal is connected to a pedal of the towed vehicle to control the acceleration or deceleration of the towed vehicle.

10. The towing system of claim 1, wherein the towed vehicle is an electric vehicle.

11. The towing system of claim 1, wherein the towing vehicle is a recreational vehicle, a motorhome, a commercial vehicle, or a non-commercial vehicle.

12. A towing system within a towing vehicle to selectively propel the towing vehicle using a towed vehicle, comprising:

a control lever, the control lever being manually operated by an operator of the towing vehicle to control and maintain energy production within the towed vehicle;

a dashboard screen, the dashboard screen being connected to a towed-vehicle camera positioned to view operational features of the towed vehicle, the dashboard screen configured to display, in real time, the operational features of the towed vehicle; and an e-pedal, the e-pedal being directly connected to a pedal of the towed vehicle to allow the operator of the towing vehicle to accelerate or decelerate the towed vehicle, wherein the operator of the towing vehicle generates energy from the towed vehicle through coordinated use of the control lever and the e-pedal, and uses such energy to selectively propel the towing vehicle.

13. The towing system of claim 12, wherein the control lever is pulled backwards to generate and collect energy from the towed vehicle into a battery, and the control lever is pushed forward to use such energy stored in the battery to propel the towing vehicle in a forward direction.

14. The towing system of claim 12, wherein the e-pedal is connected to a pedal of the towed vehicle to control the acceleration or deceleration of the towed vehicle.

15. The towing system of claim 12, wherein the dashboard screen is connected to the towed vehicle, wherein the dashboard screen displays at least one operation of the towed vehicle in real-time.

16. The towing system of claim 12, wherein the towed vehicle is an electric vehicle.

17. The towing system of claim 12, wherein the towing vehicle is a recreational vehicle, a motorhome, a commercial vehicle, or a non-commercial vehicle.

18. A method of using a towing system for operating a towed vehicle and using energy generated within the towed vehicle to propel a towing vehicle, comprising:

connecting the towed vehicle to the towing vehicle using a tow bar;

manually operating a control lever within the towing vehicle by pulling the control lever in a backward direction to collect energy generated by the towed vehicle when the towed vehicle is in motion, the generated energy being stored in a battery within the towed vehicle;

monitoring, on a dashboard screen located within the towing vehicle, real-time information indicative of the levels of energy generated or energy collected in the battery of the towed vehicle; and manually operating the control lever by pushing the control lever forward to transfer the energy stored in the battery of the towed vehicle to the towing vehicle, wherein the transferred energy propels the towing vehicle and helps move the towing vehicle with speed.

19. The method of using the towing system of claim 18, wherein the towed vehicle is an electric vehicle.

20. The method of using the towing system of claim 18, wherein the towing vehicle is a recreational vehicle, a motorhome, a commercial vehicle, or a non-commercial vehicle.

* * * * *